Feb. 12, 1952 E. S. PURINGTON ET AL 2,585,034
AUXILIARY CAMERA BREAK-IN FOR TELEVISION TRANSMISSION SYSTEMS
Filed Oct. 29, 1949 2 SHEETS--SHEET 1

Inventors
ELLISON S. PURINGTON,
JOHN HAYS HAMMOND, JR.
By [signature]
Attorney

AUXILIARY CAMERA BREAK-IN FOR TELEVISION TRANSMISSION SYSTEMS

Filed Oct. 29, 1949 2 SHEETS—SHEET 2

Inventors
ELLISON S. PURINGTON,
By JOHN HAYS HAMMOND, JR.
Attorney

Patented Feb. 12, 1952 2,585,034

UNITED STATES PATENT OFFICE 2,585,034

AUXILIARY CAMERA BREAK-IN FOR TELEVISION TRANSMISSION SYSTEMS

Ellison S. Purington and John Hays Hammond, Jr., Gloucester, Mass.; said Purington assignor to said Hammond, Jr.

Application October 29, 1949, Serial No. 124,419

7 Claims. (Cl. 178—5.8)

This invention relates to television transmitter circuits and more especially to circuits for putting a special picture on the video channel together with a special audio tonal signal, to co-operate with a special receiving picture recorder.

Various other purposes will be apparent from the following description taken in connection with the accompanying drawings in which a specific embodiment has been set forth for the purposes of illustration.

Copending application Serial No. 124,418, filed October 29, 1949, discloses a camera and receiving system for recording the transmitted pictures, and copending application Serial No. 129,951, filed November 29, 1949, describes methods of controlling and switching the operation of said camera and receiving equipment.

Figure 1:
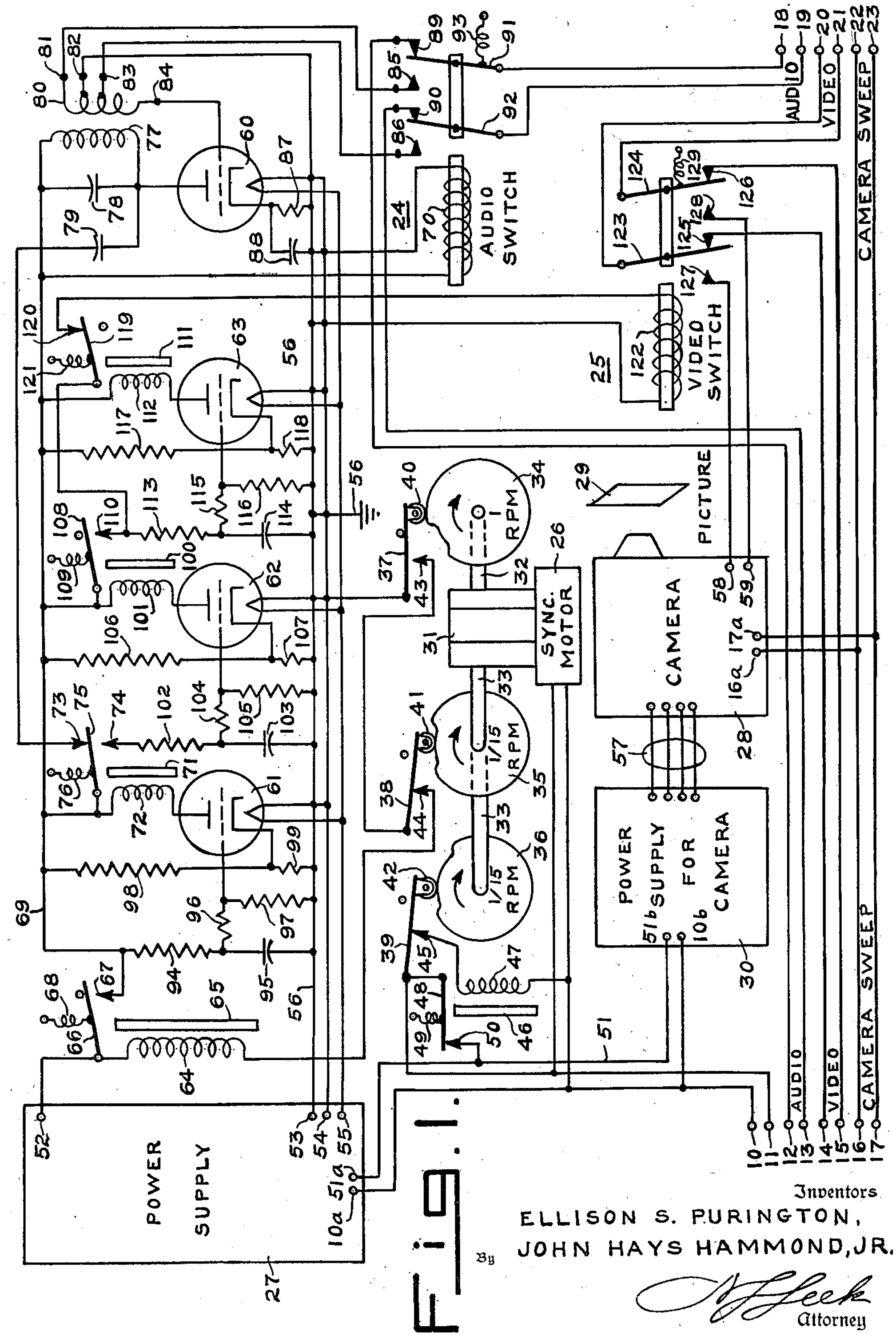
Fig. 1 is a schematic diagram showing a system for inserting the special audio and video transmissions automatically into the line between the studio and the transmitter.

In Fig. 1, the special equipment is shown as provided with input terminals 10 to 17 and output terminals, 18 to 23, the former being connected to the studio switchboard, and the latter connected to the audio and video transmitter. Terminals 10 and 11 supply a cooperating power for the special equipment; input terminals 12, 13 and output terminals 18, 19 are connected into the audio channel between the switchboard and transmitter; input terminals 14, 15 and output terminals 20, 21 are connected into the video channel between the switchboard and transmitter; and input terminals 16, 17 and output terminals 22, 23 are connected into a channel carrying the camera sweep synchronizing signals. Provisions are made for connecting the special video and audio signals into the respective channels at suitable times, for which purpose are provided a double-throw, double-pole, audio transfer switch 24 and a similar video transfer switch 25. Normally the audio input and output terminals are through connected, similarly the video input and output terminals are through connected. But when the switches 24 and 25 are individually actuated in accordance with an electrical timing system, the special audio and video transmissions are substituted for the normal transmissions until the switches are subsequently released. The rough timing is effected by a synchronous motor 26 operating as a time clock, but the fine timing necessary to co-ordinate the transmitter and receiver operations is accomplished by electronic methods using RC delay circuits, which together with the special audio generator and the transfer switches 24 and 25 are powerized from a power supply 27 which supplies also the filament power for electronic tubes.

The special video signal is produced by a television pickup camera 28, which prior to and during the transmission of the special signal is scanning the special picture material 29, and is powerized by a camera power supply 30. As previously described the special audio and video transmissions are cut into the circuit to pass to the transmitter only on closure of switches 24 and 25.

The synchronous motor 26 with input permanently connected to the A. C. power input terminals 10, 11 drives through a reducing gear 31, two shafts 32 and 33, the shaft 32 turning a timing disc 34 at one revolution per minute, and the shaft 33 turning two timing discs 35 and 36 both at one revolution in fifteen minutes. This arrangement is for the purpose of providing one special transmission every quarter of an hour, with accurate timing. These discs are provided with contact making arms 37, 38, 39 carrying insulating rollers 40, 41, 42 respectively which rise and fall with the variation in cutting of the discs, and engage fixed contacts 43, 44, 45 respectively. The arms are gravity operated, and the discs are so cut that for example contact between arm 37 and contact 43 is made from 2 seconds before the start of each minute to two seconds after, contact between arm 38 and contact 44 is made from 30 seconds before to 30 seconds after the start of each fifteen minute period, and contact between arm 39 and contact 45 is made from 3 minutes before to one minute after the start of each fifteen minute period. Conditions are depicted for example at about five seconds before the exact quarter hour. Zero reference time is taken as that for which the transmitter will commence to control the receiver, occuring approximately in the middle of the audio signal transmission, and preferably at the exact quarter hour. Therefore the conditions depicted are at zero reference time minus five seconds.

Disc 36 is for controlling the power supplies 27 and 30 for the special circuits, using an A. C. relay 46 with one end of its winding 47 connected to the contact 45 and the other end to A. C. terminal 10. The arm 39 is connected to the A. C. terminal 11, so that the relay 46 is energized from 3 minutes before zero reference time to one minute after. Terminal 10 is direct connected to input power terminals 10*a* and 10*b* of the power supplies 27 and 30, the relay armature 48 is connected to terminal 11, and normally is held open by a spring 49. Front contact 50 is connected to a bus 51 so that when the relay is closed, line 11 is connected through the relay contacts to bus 51 and to the power supply input terminals 51*a* and 51*b*. At the end of nearly three minutes, it is assumed all electronic circuits supplied by these power packs 27 and 30 are warmed up and ready to operate electronically.

Discs 34 and 35 provide for closure of a circuit from two seconds before to two seconds after the zero reference time, which is approximately the length of the audio control signal that is sent out by the transmitter. Contact from arm 37 to 43 is made once a minute, contact 43 is permanently connected to arm 38, contact from arm 38 to contact 44 is made only during that minute of the quarter hour period in which it is desired to operate the circuit. By the series connection of the two sets of contacts, circuit from arm 37 through contact 43 to arm 38 through contact 44 is made only during the four seconds of desired operation during the fifteen minute period.

The output terminals of the power supply 27 are positive high voltage terminal 52, grounded negative high voltage terminal 53, and filament terminals 54 and 55, of which 54 as well as terminal 53 is connected at various suitable points to ground line 56. The power supply 30 is suitable for the requirements of the camera 28, the design of which is not involved in the present invention, and the supply and camera are connected by a power cable 57. The synchronizing line with terminals 16 and 17 is connected to the camera terminals 16*a* and 17*a*. This line carries signals for maintaining synchronous operation of the camera sweep circuits, and it will be understood that the synchronizing pulses for transmission to the receiver may be sent to the transmitter by other channels, and these properly mixed with the video signals and the D. C. video component. The camera scans the picture sheet 29 to produce the special video signals, and if desired the horizontal or vertical sweep of the camera may be different from standard cameras such that the written or printed matter converted into video signals will be reversed and not readable on a receiving television screen except by use of a mirror or other image reversing device. These video signals appear at the camera output terminals 58, 59 both before, during and after the operation of the video transfer switch 25.

For producing the audio tone and timing the relative occurrences of the various audio and video transmissions and for operating the audio and video transfer switches, there is provided an electronic circuit with four triode tubes 60, 61, 62, 63 in order of their first functioning. The filaments of these tubes are preheated from power supply 27 which as above described is energized about three minutes before use, in accordance with the operation of timing disc 36 and associated circuits. Plate power supply is turned on for the tubes about two seconds before zero reference time through the conjoint operation of timing discs 34 and 35 and associated circuits. For this purpose arm 37 is connected to ground line 56 and therefore to the negative terminal 53 of the high voltage power supply, contact 43 is connected to arm 38 and contact 44 is connected to one end of the winding 64 of a relay 65, the other end of which is connected to armature 66 and the positive high voltage terminal 52. The armature 66 is normally held away from the relay front contact 67 by a spring 68. When the contacts controlled by discs 34 and 35 are both closed, current passes from the positive terminal 52 through the relay winding 64 and the disc contacts to the negative terminal 53 of the power supply, thereby closing the armature and making a connection from terminal 52 to contact 67, which remains closed approximately from −2 seconds to +2 seconds, during which time the electronic circuits are operative.

Contact 67 is connected to the operative positive high voltage line 69 which immediately operates the audio transfer switch 24, one end of the winding 70 of which is connected to line 69 and the other to ground line 56. At the same time the tube 60 operates immediately as an audio oscillator. By the conjoint action of tube 60 and switch 24, the audio output terminals 18, 19 cease to be energized by the program audio signals applied at input terminals 12, 13 and are energized by whatever signal is produced by the oscillator 60. This is for example the tonal frequency which may be initially 6500 cycles until two seconds later when the second tube 54 operates, and thereupon the tone changes to 7000 cycles at precisely zero reference time. When the third tube 62 operates, at say plus 0.8 second, the video switch 25 is actuated but is released at plus 1.2 second when the fourth tube 63 operates. All circuits are automatically reset at plus 2.0 seconds when operation of disc 34 breaks the circuit through relay winding 64, deenergizing the electronic circuits and the transfer switches.

To explain the operation of tube 60 it is necessary to refer to relay 71 with winding 72 in the lead from high voltage line 69 to the plate of triode 61. This relay has a back contact 73 involved in operation of tube 60, and a front contact 74 involved in the timing of tube 62 with respect to tube 61. The armature 75 normally held open to connect with back contact 73 by a spring 76, is connected to the operative high voltage line 69.

The oscillator triode 60 has its plate conductively connected to line 69 thru the oscillator coil 77 shunted by capacitor 78, and the plate is also connected through capacitor 79 to the back contact 73, which in turn is operatively connected to line 69 when the relay 71 is open. The coil 77 is suitably coupled to a feedback coil 80 with the second and fourth terminals 82 and 84 connected respectively to ground and to the grid of triode 60, while the first and third terminals 81 and 83 are connected to front contacts 85 and 86 of the audio transfer switch. The cathode of tube 60 is connected to ground line 56 through resistor 87 shunted by capacitor 88. The coil windings 77 and 80 are suitably arranged to produce oscillations and with suitable circuit constants the frequency of oscillation is determined by the inductance of coil 77 and the shunting capacitance, which is that of capacitor 78 paralleled by capacitor 79 when the relay 71 is open and is that of capacitor 78 alone when relay 71 is closed thereby breaking the back contact 73.

By suitable design the frequency in the former condition is made to be for example 6500 cycles and in the latter condition is made to be for example 7000 cycles. The audio line into which terminals 12 and 13 and terminals 18 and 19 are connected is of the balanced type. The taps 81 and 83 are so chosen as to develop equal but oppositely phased voltages between the two contacts 85 and 86 and ground. Input terminals 12 and 13 energized by the program audio signals are connected to the back contacts 89 and 90 of the audio transfer switch 24, and the moving blades 91, 92 actuated by the coil 70 but normally held to the back contacts by a spring 93 are connected to the audio output line terminals 18 and 19. During the interval of four seconds when there is voltage between high voltage line 69 and ground line 56, the switch blades of switch 24 are thrown to the left, operatively connecting by the front contacts the oscillator output terminals 81 and 83 to the output line terminals 18 and 19. At other times the program input terminals 12, 13 are connected through the back contacts of switch 24 to the output audio terminals 18 and 19.

For providing a suitable delay, say 2 seconds between the closure of relay 65, which throws the audio transfer switch and starts the audio oscillations and the closure of relay 71 which changes the frequency of oscillations from 6500 cycles to 7000 cycles, the contact 67 is connected through a resistor 94 to one terminal of capacitor 95, which in turn is connected through resistor 96 to the grid of tube 61, which in turn is connected to the ground line 56 through resistor 97, to which ground line the other end of capacitor 95 is also connected. The operative high voltage lead 69 is connected through resistor 98 to the cathode of tube 61, which is connected to ground through resistor 99. The line 69 is also connected through the winding 72 of the relay 71 to the plate of tube 61 as has been previously described.

When the relay 65 closes to establish a high voltage supply for tube 61, the grid of tube 61 is initially at ground potential, but the cathode is positive due to the current from line 69 through resistors 98 and 99 with constants so chosen that the tube 61 is near or beyond cutoff so that initially little or no current flows through the winding 72 of relay 71. As the capacitor 95 charges to make its ungrounded terminal positive, the potential of the grid of tube 61 becomes positive to approach cathode potential and the tube 61 begins to pass plate current, and at a certain value of plate current, say 4 milliamperes, the relay 72 operates, breaking the connection from capacitor 79 to the line 69, and establishing connection between line 69 and contact 74. This should take place when the grid potential is considerably lower than its final value. Thus the constants may be chosen such that the final current through the relay winding 72 is say 10 milliamperes, and the grid of tube 61 is slightly above cathode potential. With suitable design the delay involving the choice of constants may be such that the relay 71 operates 2 seconds after closure of relay 65 with a high degree of reliability. This operation of relay 71 occurs at zero time, which may if desired correspond to an accurate time signal. If the adjustments are not perfect or the 60 cycle supply line is not exactly time regulated, it is possible to insert a continuously variable and rotatable phase shifter in the line to the synchronous motor, and drive it in accordance with the time difference between the operation of relay 72 and a standard radio time signal, so as to maintain the timing of operation of relay 72 precisely.

For timing the operation of the video transfer switch, the triode 62 is connected to operate a relay 100 with winding 101 in the lead from the line 69 to the plate, and has timing control circuits 102 to 107 arranged and operating similar to parts 94 to 99 associated with tube 61, so that upon closure of relay 71 associated with tube 61, the relay 100 will close after a suitable time delay as for example 0.8 second. The relay armature 108 normally held open by a spring 109 is connected to the line 69 and its back contact is not utilized. The front contact 110 is connected to line 69 when relay 100 operates.

The final tube 63 similarly has a relay 111 with the winding 112 in the lead from the line 69 to the plate of tube 63, and associated therewith are elements 113 to 118 similar to elements 102 to 107 for the tube 62. When relay 100 operates, connecting contact 110 to line 69, the relay 111 operates after a suitable delay time, as for example 0.4 second. The armature 119 of relay 111 is connected to contact 110 of relay 100. The back contact 120 of relay 111 against which the armature 119 is normally held by a spring 121 is connected to one end of the winding 122 of the video transfer switch 25, the other end of which is connected to ground line 56. It is clear that current passes through the winding 122 of the video transfer switch 25 only after closure of the armature of relay 100 and before closure of the armature 119 of relay 111, that is during the time interval when the circuits 113 to 118 are delaying the operation of the tube 63.

The video transfer switch 25 has two moving blades 123, 124, with back contacts 125, 126, and front contacts 127, 128. The contacts 125, 126 are connected to the input terminals 14, 15, carrying the program originating in the studio, and the contacts 127, 128 are connected to the terminals 58, 59 carrying the picture information produced by camera 28 from the flash picture 29. Normally the switch blades are held back to connect with the back contacts 125, 126 by a spring 129, so that the input terminals 14, 15 are connected through the switch to the output terminals 20, 21. But when the switch is actuated during the time interval between operations of relays 100 and 111, the studio program is momentarily discontinued, and the terminals 58, 59 of the camera 28 are connected to the output line 20, 21.

Figures 2, 3:
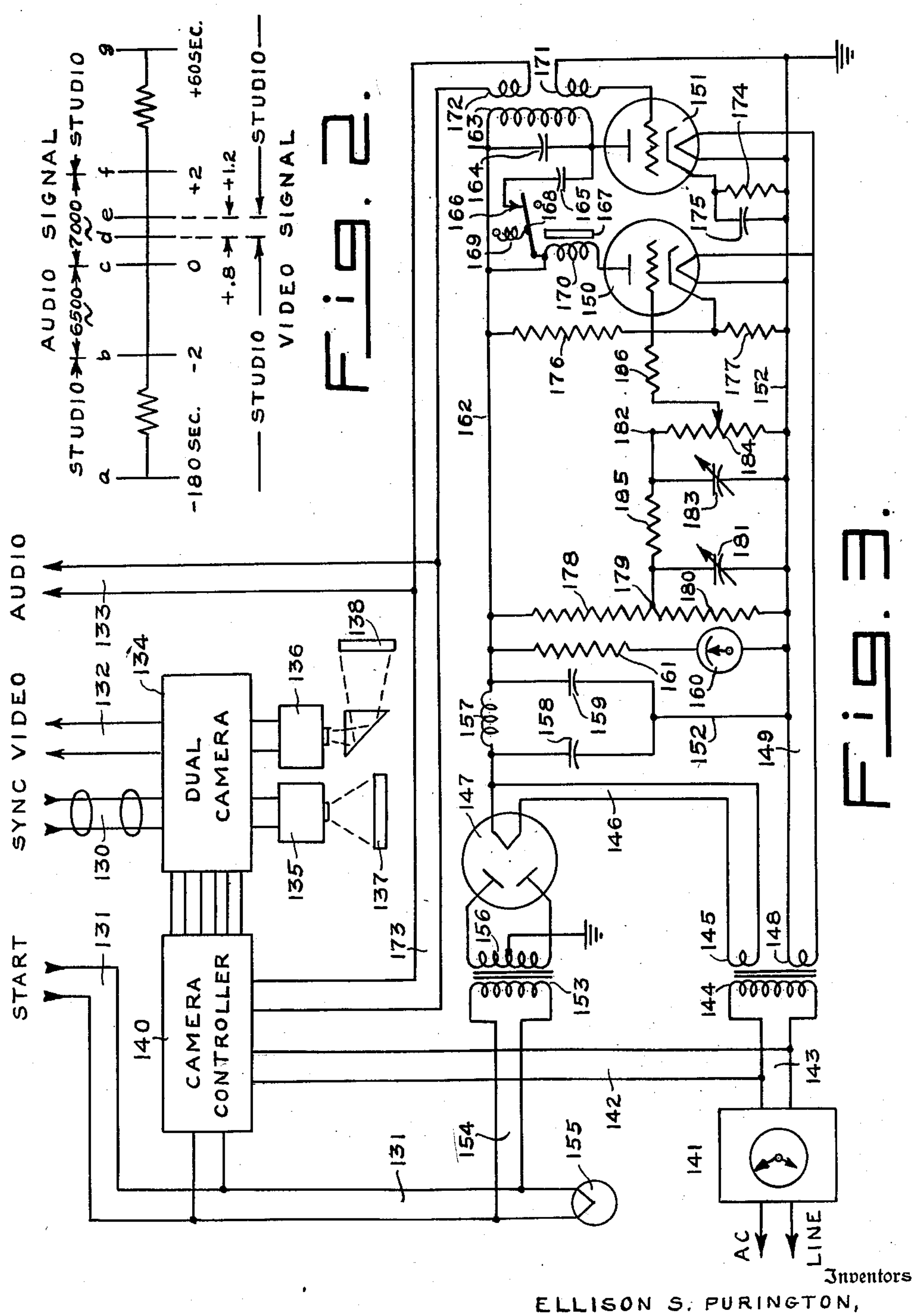
Fig. 2 is a diagram showing the timing relations between different audio and video transmissions.
Fig. 3 is a schematic diagram showing a system for controlling the special audio and video transmissions at any desired time by the station personnel.

The operation of the circuit will be explained with reference to Fig. 2 indicating a possible time schedule. The synchronous motor 26 is continuously running, and on closure for disc 36, energizing A. C. relay 46, power supply circuits 27 and 30 for the electronic devices are turned on at instant *a*, say 180 seconds before the zero reference time of the exact quarter hour. The camera 28 thereupon in due course makes available a video voltage at terminals 58 and 59 corresponding the the special flash picture 29. Subsequently upon the joint operation of the contacts associated with discs 34 and 35, the relay 65 operates at time *b*, say 2 seconds before zero reference time. This operation supplies operative high voltages for the tubes 60, 61, 62, 63 which operate in sequence, the first tube 60 operating immediately to produce an audio tone of say 6500 cycles until the next tube 61 operates. Also the audio transfer switch 34 is thrown immediately to break the studio audio program and substitute the tone developed by the oscillator 60. After a suitable delay determined in part by choice of the capacitor 95, the tube 61 passes current and relay 71 operates at time c, which may be zero reference time, changing the audio tone generated by prior tube 60 to say 7000 cycles, and starting the building up of grid voltage for the following tube 62. On closure of relay 100 after a suitable time delay determined in part by choice of the capacitor 103, the relay 111 not yet being actuated, the video transfer switch 25 is operated to substitute the video signals from special flash camera 28 scanning the special material 29, for the regular studio video program. This may take place at time d, say 0.8 second after zero reference time. Closure of relay 100 also starts the building up of voltage for the grid of tube 63, and after a suitable time, say 0.4 second the relay 111 operates at time e, say 1.2 seconds after zero reference time, thereby opening the circuit for the winding of the video transfer switch and causing the studio program to be resumed. When the circuit of the relay 65 is broken by opening of the contacts associated with disc 34 at time f, which is two seconds after zero reference time, the voltage to line 69 is discontinued, the audio signal ceases, all relays 71, 100, 111 and the transfer switches 24 and 25 are deprived of operating power, so that the special audio and video transmission is terminated and the studio program resumed. At about 56 seconds later the contacts of disc 34 will again be made, but by this time the contacts of disc 35 will be broken so that the relay 65 will not be actuated to repeat the special program. Power is also shut off at time g, about +60 seconds by the contacts of disc 36, except for the synchronous motor 26 which continues to operate to cut in a special flash fifteen minutes later. The material 29, of course may be changed at any time between operations of the equipment.

Under some conditions it may not be desirable to operate the special audio and video circuits absolutely independent of other programs, but under the control of the program operator who normally switches the studio circuits. Moreover it may be desirable to send out the special program as an adjunct to some interprogram display or advertising. Such an arrangement is possible in Fig. 3 wherein the circuits shown are connected to be under the control of the program operator from whose console two lines are connected, namely the "synchronizing" line and the "start" line, and to whose console two lines are connected, namely the "video" line 132 and the "audio" line 133. The sync line 130 comes to a dual camera system 134 with two cameras 135 and 136 the forming scanning material 137 pertaining to a paid commercial and the latter scanning the flash picture 138, if desired using a prism 139 or other image position reversing device. Thus the material 137 may be of value to all television receiver observers, while that of 138 may be of interest only to those equipped with video recording devices. The output video line 132 goes back to the console. The camera system 134 is connected to a camera controller 140 by which the camera is powerized and by which the flash material 138 is inserted into the program at a suitable time, relative to an audio tone signal. A timer 141 connected to an A. C. power line may serve to powerize a part of the system during the interval, say three minutes before each quarter hour to three minutes after during which the equipment may be used, but it will be understood the operation of the system need not be exactly at the nominal time. Thus the A. C. current controlled by the timer 141 passes over line 142 to operate the camera system 134 to 140, and over line 143 to a transformer 144 with secondary 145 connected over line 146 to heat the filaments of a rectifier 147, and a secondary 148 connected by a line 149, to the filaments of two triode tubes 150, 151 concerned with producing the audio tone signal. One leg of the filament line 149 is the ground line 152. A transformer 153 is connected to A. C. start line 131, through branch 154, and the line 131 may be provided with an indicating lamp 155. The secondary 156 of transformer 153, with a grounded center tap is connected to drive the rectifier 147 in the usual manner immediately when the start line is energized by power such as 60 cycle alternating current. This will occur when the console switch is thrown, also connecting the video output line 132 to the video transmitter and also connecting the audio output line 133 to the audio transmitter. Thus after the start line is energized, the rectifier output is filtered by choke 157 in combination with capacitors 158, 159, metered by volt meter 160 and multiplier 161, putting a positive high voltage on line 162 with respect to ground line 152. The plate of triode 151 is connected through an inductor 163 and a capacitor 164 to line 162 and also through a capacitor 165 to the back contact 166 of a relay 167 with an armature 168 connected to line 162 normally held in contact with back contact 166 by a spring 169, except when the winding 170 of the relay which is connected between line 162 and the plate of tube 150 carries sufficient current to break the contact. The grid of triode 151 is connected to ground line 152 through a coil 171 suitably inductively coupled to inductor 163 to produce oscillations, which may be for example 6500 cycles when the armature 169 is connected to back contact 166, and 7000 cycles when the armature is pulled down by the current in the winding 170. An output coil is connected to the audio line 133, and also by branch line 173 to the camera controller 140. The cathode of triode 151 is connected to ground through resistor 174 shunted by capacitor 175.

For causing the relay 167 to operate at a time say 2 seconds after the initial oscillation of triode 151, the cathode of triode 150 is connected to line 162 by resistor 176 and to ground line 152 by resistor 177, so chosen as to bias the tube 150, near, at or beyond cutoff when the grid is at ground potential. The line 162 is connected through resistor 178 to input terminal 179 of an RC type low pass filter, with resistor 180 and capacitor 181, connected between terminal 179 and ground line 152, with an output terminal 182 and a capacitor 183 and a potentiometer 184 connected from terminal 182 to ground, and with a resistor 185 connecting the input and output terminals 179 and 182. The variable arm of the potentiometer 184 is connected through a resistor 186 to the grid of the triode 150. Prior to operation of the rectifier 147, the capacitors 181 and 183 are fully discharged so that the grid of triode 150 is at ground potential. As the line 162 is energized, charges build up in capacitors 181 and 183, making the output terminal 182 increase in potential as a function of time. The constants of resistors and capacitors and the setting of potentiometer are so made that the tube grid voltage rises to cause operating plate current to flow through relay winding 170 at a suitable time and with sufficient precision after the energization of line 162. When this occurs the tone changes say to 7000 cycles, which is sent over the audio line 133 to the console and thence to the receiver by radio. If a picture is desired, the receiver recorder is set up and is ready for a picture at say one second after the start of the 7000 cycle tone. The audio signal in line 173 is impressed upon the camera controller 140, which contains suitable selector and delay circuits such that the dual camera will continue to deliver video signals obtained by scanning object 137 from the start of the 6500 cycle tone to about .8 second after the 7000 cycle tone, when it will then deliver video signals from the special material 138 for .4 second during which time the special picture will be recorded, when the camera will automatically switch back to material 137, which will be transmitted until the control operator switches to a different studio, thereby disconnecting the audio and video lines 132 and 133 from the station transmitter. It will be understood that the console may be arranged to give audio signals accompanying the video signals from material 137 except when the start line 131 is energized for synchronizing the receiver to the transmitter for the special material 124. Thus for a fifteen second commercial, the material 137 could be sent for about the first seven seconds and the last seven seconds with less than a second for the special material 138, and with only four seconds required for the synchronizing tone.

What is claimed is:

1. In a television transmitter having audio and video transmission channels normally carrying audio and video programs, a control signal generator having means for producing a pair of distinctive control signals, timed means interrupting said audio program and impressing said control signals in timed sequence on said audio transmission channel, video camera means including means for scanning a still picture, timed means synchronized with the start of transmission of said second control signal to interrupt the transmission of said video program and impress the output of said video camera on said video transmission channel for transmitting said picture a predetermined time interval after the start of said second control signal transmission, and timed means for terminating the transmission of said picture a selected time period after its start and restoring the transmission of said video program.

2. A transmitter as set forth in claim 1 in which the signal producing means in said control signal generator is operated to produce different audio tones.

3. A transmitter as set forth in claim 1 in which the timed means impressing the control signals in timed sequence is arranged to transmit the first control signal for a predetermined period of time, then transmit the second control signal for a predetermined period of time and transmit the video picture for a shorter predetermined period of time during the transmission of said second control signal.

4. In a transmitter as set forth in claim 1, timed means cooperating with said first-named timed means initiating the transmission of said signals at selected intervals.

5. A transmitter, as set forth in claim 1, including electron tubes for producing signals and for controlling switching functions, power means for powerizing said tubes, and means timed with respect to said control signals to actuate said power means for a period overlapping the control signal transmission periods whereby the tubes are rendered operative during transmission periods.

6. In a transmitter as set forth in claim 5 timed means to render said power means operative to powerize said tubes and manual means for controlling said tubes to initiate said transmissions during the periods of actuation of said power means.

7. A transmitter as set forth in claim 1 having means whereby said audio program transmission is interrupted only during the transmission of said control signals and said video program transmission is interrupted only during the transmission of said still picture.

ELLISON S. PURINGTON.
JOHN HAYS HAMMOND, JR.

REFERENCES CITED

The following references are of record in the file of this patent:

UNITED STATES PATENTS

| Number | Name | Date |
|---|---|---|
| 2,164,297 | Bedford | June 27, 1939 |
| 2,181,564 | Goldsmith | Nov. 28, 1939 |
| 2,193,869 | Goldsmith | Mar. 19, 1940 |
| 2,240,420 | Schnitzer | Apr. 29, 1941 |
| 2,272,043 | Browne | Feb. 3, 1942 |
| 2,314,471 | Wright | Mar. 23, 1943 |
| 2,402,083 | Reid | June 11, 1946 |
| 2,454,651 | Homrighous | Nov. 23, 1948 |